(12) United States Patent
Kaeseler

(10) Patent No.: US 9,393,639 B2
(45) Date of Patent: *Jul. 19, 2016

(54) SPOT WELDING CAP CHANGER

(71) Applicant: 002152706 ONTARIO LTD., Oakville (CA)

(72) Inventor: Werner Kaeseler, Baunatal (DE)

(73) Assignee: 002152706 ONTARIO LTD., Oakville, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/848,782

(22) Filed: Sep. 9, 2015

(65) Prior Publication Data

US 2015/0375333 A1     Dec. 31, 2015

Related U.S. Application Data

(63) Continuation of application No. 14/273,926, filed on May 9, 2014, now Pat. No. 9,168,609, which is a continuation of application No. 13/680,915, filed on Nov. 19, 2012, now Pat. No. 8,742,281, which is a continuation of application No. 11/997,131, filed as application No. PCT/EP2006/064417 on Jul. 19, 2006, now Pat. No. 8,314,356.

(30) Foreign Application Priority Data

Jul. 28, 2005  (DE) ..................... 10 2005 035 915

(51) Int. Cl.
*B23K 9/26*     (2006.01)
*B23K 11/30*    (2006.01)
(Continued)

(52) U.S. Cl.
CPC ............ *B23K 11/3072* (2013.01); *B23K 11/11* (2013.01); *B23K 11/115* (2013.01); *B23Q 3/15573* (2013.01)

(58) Field of Classification Search
None
See application file for complete search history.

(56) References Cited

U.S. PATENT DOCUMENTS 3,745,646 A * 7/1973 Kristiansson .......... B21D 37/04
                                                    483/29
3,765,291 A * 10/1973 Stenfeldt .............. B21D 37/145
                                                    414/728
(Continued)

FOREIGN PATENT DOCUMENTS

CA      2395598 A1     8/2001
DE      2048495 A1 *   4/1972 ............. B21D 37/04
(Continued)

OTHER PUBLICATIONS

Canadian Office Action for Canadian Application No. 2,614,533 Letter of Oct. 26, 2015.
(Continued)

*Primary Examiner* — Kiley Stoner
(74) *Attorney, Agent, or Firm* — Browdy and Neimark, PLLC

(57) ABSTRACT

The invention relates to a spot welding cap changer (1) with a cap puller (2) and two cap magazines (3, 3A), the cap puller (2) having a gripper (20) with spring-loaded, pivotable jaws (21, 22), which in response to a turning and axial pulling-off movement detaches a spot welding cap (K) of a pincer spot welding head introduced into it from a shaft of the pincer welding head in such a way that it is clamped to prevent it twisting, and the cap magazines (3, 3A) holding spot welding caps respectively in a round cap carrier (31) such that they are circularly arranged in a directed and oriented manner and are respectively transported individually one after the other into an access position against a stop (32) by an advancing force (P).

60 Claims, 5 Drawing Sheets

(51) Int. Cl.
*B23Q 3/155* (2006.01)
*B23K 11/11* (2006.01)

(56) References Cited

U.S. PATENT DOCUMENTS

| | | | | |
|---|---|---|---|---|
| 4,084,300 | A * | 4/1978 | Narushima | B23Q 3/15526 29/26 A |
| 4,794,221 | A | 12/1988 | Takabe et al. | |
| 4,870,744 | A * | 10/1989 | Araki | B23Q 3/15706 483/56 |
| 5,073,692 | A | 12/1991 | Jackson et al. | |
| 5,387,774 | A * | 2/1995 | Boyer | B23K 11/3072 219/117.1 |
| 5,495,663 | A | 3/1996 | Saito | |
| 5,530,218 | A | 6/1996 | Nakamura et al. | |
| 5,734,141 | A | 3/1998 | Voilmy et al. | |
| 7,353,578 | B2 | 4/2008 | Nakajima et al. | |
| 8,134,356 | B2 | 3/2012 | Dobberpuhl et al. | |
| 2003/0106878 | A1 | 6/2003 | Sundstrom | |
| 2003/0201253 | A1 * | 10/2003 | Rigaux | B23K 11/3072 219/86.8 |
| 2005/0023250 | A1 * | 2/2005 | Izumi | B23K 11/3072 219/86.8 |

FOREIGN PATENT DOCUMENTS

| | | | | |
|---|---|---|---|---|
| DE | 3605099 | A1 * | 10/1987 | ......... B23K 11/3072 |
| DE | 19905477 | A1 | 8/2000 | |
| DE | 101 24 243 | C1 | 11/2002 | |
| DE | 10124243 | | 11/2002 | |
| DE | 102 22 248 | A1 | 11/2003 | |
| DE | 10222248 | | 11/2003 | |
| EP | 2072170 | A1 * | 6/2009 | ......... B23K 11/3072 |
| FR | 2 760 392 | A1 | 9/1998 | |
| FR | 2760392 | | 9/1998 | |
| JP | 2002-79381 | | 3/2002 | |
| JP | 2005111537 | A | 4/2005 | |
| WO | 2004/035251 | A2 | 4/2004 | |
| WO | 2004035251 | | 4/2004 | |

OTHER PUBLICATIONS

Changer & Dresser, Inc., Petition for Inter Parties Review of U.S. Pat. No. 8,742,281 Pursuant to 35 U.S.C. §§ 311-319 and 37 C.F.R. § 42, dated May 1, 2015.
Translation of JP 2002-79381 from Petition for Inter Parties Review of U.S. Pat. No. 8,742,281 Pursuant to 35 U.S.C. §§ 311-319 and 37 C.F.R. § 42, dated May 1, 2015.
Certified Translation of DE 199 05 477 from Petition for Inter Parties Review of U.S. Pat. No. 8,742,281 Pursuant to 35 U.S.C. §§ 311-319 and 37 C.F.R. § 42, dated May 1, 2015.
Delcaration of Dr. Michael Miles from Petition for Inter Parties Review of U.S. Pat. No. 8,742,281 Pursuant to 35 U.S.C. §§ 311-319 and 37 C.F.R. § 42, dated May 1, 2015.
002152706 Ontario Limited, Patent Owner's Response to Petition for Inter Parties Review of U.S. Pat. No. 8,742,281, dated Aug. 11, 2015.
The New Oxford American College Dictionary, pp. 86, 202, 262, 309, 1200, 1413, Oxford University Press, 2nd Edition 2005 from Patent Owner's Response to Petition for Inter Parties Review of U.S. Pat. No. 8,742,281 dated Aug. 11, 2015.
Merrian-Webster's Collegiate Dictionary, pp. 68, 147, 148, 189, 224, 875, 1038, 11th Edition 2003, from Patent Owner's Response to Petition for Inter Parties Review of U.S. Pat. No. 8,742,281 dated Aug. 11, 2015.
Second Amended Complaint, *002152706 Ontario Limited et al. v.Changer & Dresser Corp.*, Case No. 1:15-cv-00020 (NYWD) ECF 12, Apr. 17, 2015 from Patent Owner's Response to Petition for Inter Parties Review of U.S. Pat. No. 8,742,281 dated Aug. 11, 2015.
Answer to Second Amended Complaint and Counterclaim, *002152706 Ontario Limited et al. v.Changer & Dresser Corp.*, Case No. 1:15-cv-00020 (NYWD) ECF 14, May 4, 2015 from Patent Owner's Response to Petition for Inter Parties Review of U.S. Pat. No. 8,742,281 dated Aug. 11, 2015.
The McGraw-Hill Dictionary of Scientific and Technical Terms, p. 2030, 6th Edition 2004 from Patent Owner's Response to Petition for Inter Parties Review of U.S. Pat. No. 8,742,281 dated Aug. 11, 2015.
English Translation of DE 199 05 477 Koch from Patent Owner's Response to Petition for Inter Parties Review of U.S. Pat. No. 8,742,281 dated Aug. 11, 2015.

* cited by examiner

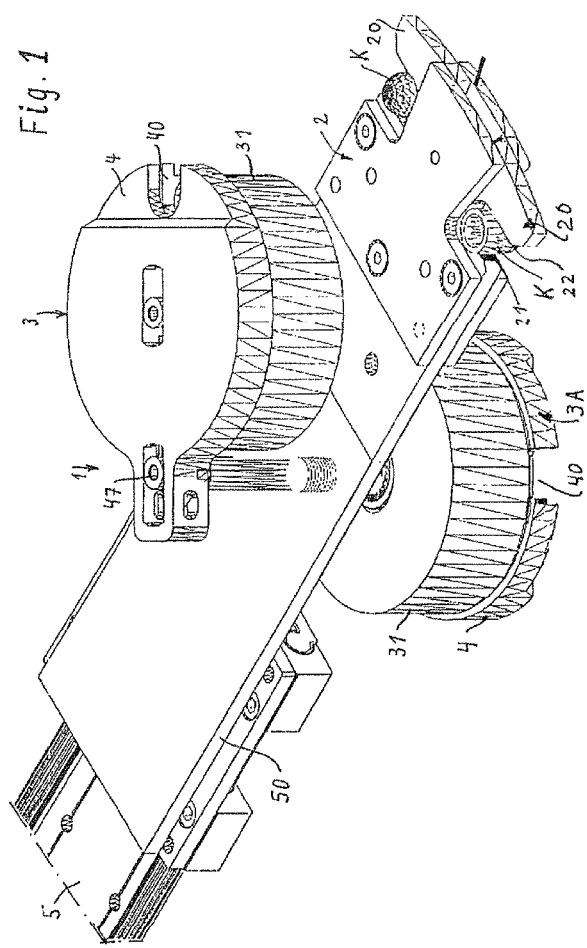

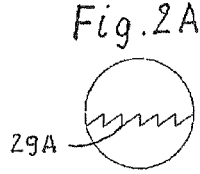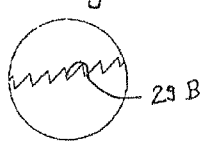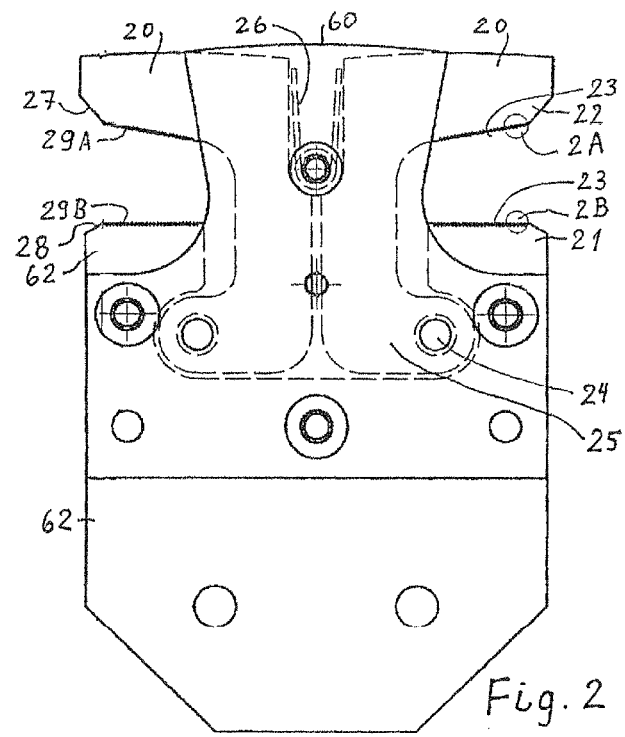

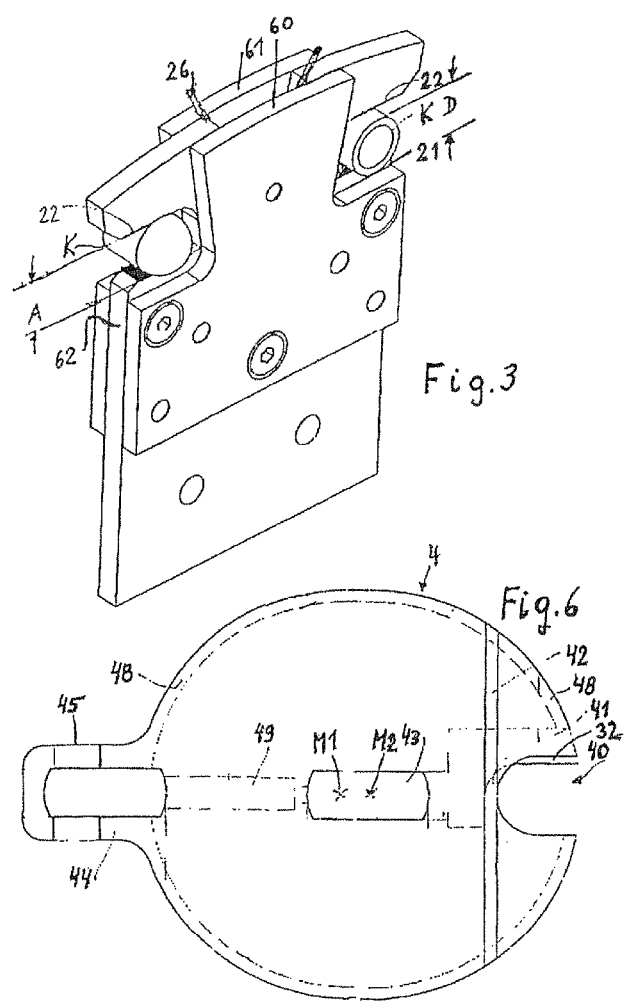

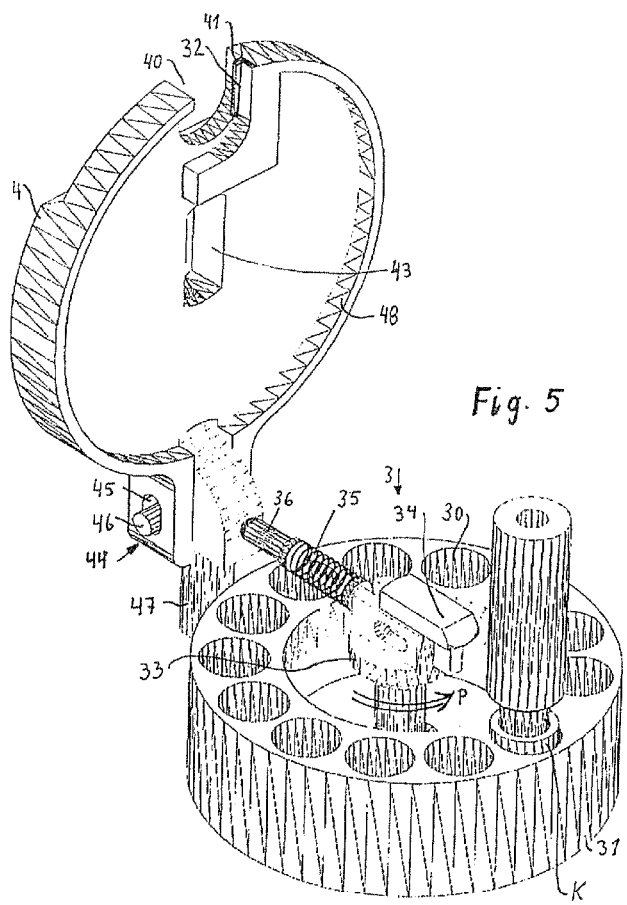

SPOT WELDING CAP CHANGER

The invention relates to a spot welding cap changer with a cap extractor and two cap magazines, the cap extractor having a gripper with spring-loaded, pivoting jaws, which in response to a turning and axial extraction movement detaches a spot welding cap of a pincer spot welding head inserted into it from a shaft of the pincer welding head in such a way that it is clamped to prevent twisting,
and the cap magazines holding spot-welding caps in a cap carrier in such a way that they are circularly arranged in a directed and oriented manner and are one by one transported by an advancing force against a stop, into an access position allowing to attach them axially to the free shaft of the pincer and to extract them with it.

Such a mechanical electrode cap changer is known from the DE 102 22 248 A1. It has a two-part cap extractor, accessible from both sides, in a body separate from the magazine.

Since gravity causes the caps to slide against a cap stop, the device can only be operated stationary in the vicinity of a mobile welding robot. Changing caps at a stationary pincer spot welding head, to which each component is fed by a robot for welding, is therefore not possible. The pincer spot welding heads/welding installations often have short shafts, which are for instance curved, so that the cap extractor, equipped with three large jaws and accordingly big, cannot be positioned for extraction.

It is the object of the invention to provide for an automatic faster and safer exchange of the spot welding caps both at mobile and stationary spot welding installations with a short access distance.

The solution resides in that
the cap extractor has two opposed grippers, each with jaws that are open at their ends and can be rotated towards each other with approximately parallel toothed grip surfaces whose distance is slightly smaller than a diameter of a spot welding cap,
and each cap magazine contains a cap carrier, which, driven by a spring box, presses by way of its advancing force one of the caps respectively against the stop, and in the access position a rim overlap overlaps the cap on one side.

Advantageous forms of the invention are indicated in the subclaims.

In the new embodiment the cap extractor and the magazine are mounted on a support which preferably is spring-mounted. In contrast to the known system, the new construction design gives the possibility not only to be used at welding robots, but also at stationary pincer welding heads or welding installations.

Compared with the known clamping system with three jaws, the new cap-extraction installation provides for shorter clamp and spin travels, therefore much shorter intervals for detaching the caps. Moreover, from the smaller design results a wider array of application, for instance at non-standard pincers or very short, curved shafts.

The two cap extractors are each open at the ends of the jaws and thus accessible to a cap. The jaws grip it directly by way of the undersize of their distance and detach the cap, whereby a rotation around an angle of about 30-60° suffices. This way a cap change is possible even in extremely narrow confines. Since the two grippers are oriented in opposite directions, respectively one of them is accessible from the various sides in a clockwise rotation, so that no turning of the pincer is necessary, even if the pincer shafts are screwed on.

Furthermore, the round magazine is much more compact than the straight magazine functioning by gravity of the known installation. It can be held and operated in any position because of the spring drive.

Furthermore, the two round magazines arranged on parallel axes provide in each case for an access with short radial travel to the access positions in the access openings. In an embodiment with a magazine cover, this cover is directly shifted during access, far enough to let the rim overlap uncover the cap frame, so that the detaching is possible. The example shows a radial infeed and an axial access of the shafts into the magazine.

Both partial devices, the cap changer, and the cap magazine, are mounted on a support close to one another, and thus can be set up stationary, or mounted to a robot arm in a fixed or detachable manner. In the first case the welding robot changes the caps of its own pincer, and in the second case the robot changes the caps at the stationary pincers or installations respectively by means of the device. The changing device at the robot arm is movably mounted, constantly ready for operation in a free space next to the gripper of the robot or on a guide rail, or it is located in a parking position, where it can be picked up and brought to operation by the gripper; this is called alternating pincer principle.

Advantageously, cap sensors are arranged on the device, which indicate whether a cap is in place or not. Moreover, the charging level of the magazines is monitored. This way it is ensured that after a cap change a cap is in place at the shaft of the pincer welding head before the cooling water is switched on. Furthermore it can be verified, whether the old cap was removed, when it is reported that there is no cap in place while the shaft is approaching.

The embodiment of the cap magazine without a cover holds the welding caps in an elastic cap carrier in a close fit, axially movable by propulsive or tractive force.

Advantageous embodiments are represented in the FIGS. 1 to 6.

FIG. 1 shows the entire device schematically and in perspective;

FIG. 2 shows a transparent top view of the cap extractor;

FIG. 2A, 2B show detailed enlargements of the grip surfaces;

FIG. 3 shows a perspective of the cap extractor;

FIG. 5 shows a cap magazine in perspective, open, enlarged

FIG. 6 shows a top view of the magazine cover.

Figure 4:
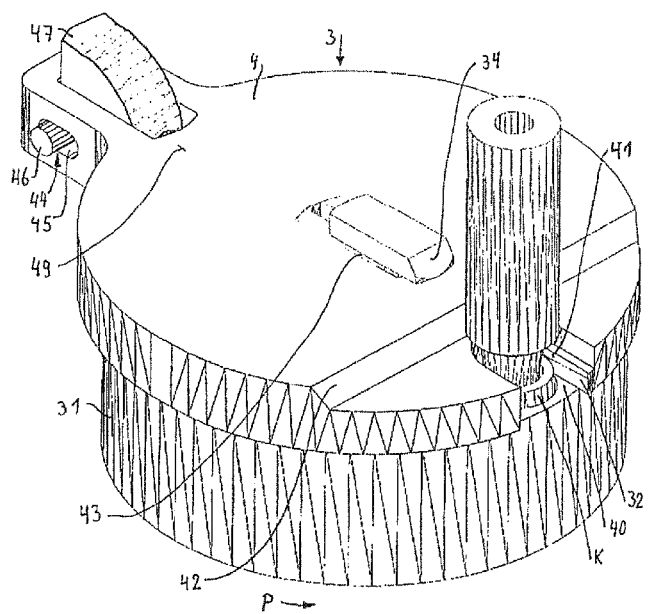
FIG. 4 shows a cap magazine in perspective, closed, enlarged

FIG. 1 shows a complete spot welding cap changer 1, which is movably held on a support rail 5 at a robot arm. Alternatively, it is firmly mounted with the mounting plate 50. The bilaterally equipped cap extractor 2 is bolted at the free end of the mounting plate 50, with the two grippers 20 respectively on the sides, their direction opposite to one another. Pulled off caps K are depicted between the jaws 21, 22, after being detached at the rim of a storage container they drop into it.

Offset to the rear from the cap extractor 2 respectively one cap magazine 3, 3A laterally offset to the other is mounted on the mounting plate 50, with the magazine cover 4 respectively directed laterally and the access openings 40 oriented axially parallel to the extracted welding caps K that are still held by the gripper, so that the shafts of the pincer spot welding head have to travel only short distances while changing the caps.

FIG. 2 shows a top view on the cap extractor 2, which consists of very few parts. The grippers 20 are composed of one fixed, toothed jaw 21 respectively, and one jaw 22 which is mounted in such a way that it can be pivoted towards said jaw 21. The pivot joint 24 is located behind the fixed jaw 21 by way of a U-shaped structure of the movable jaw arm 25, so that a cap K positioned in the gripper 20 will be clamped at a twist depending on the direction of rotation.

The initial pressing force of the jaws 21, 22 is caused by a bracing spring 26, which for example, is formed as a spiral or bracing spring with spread ends, each pressing against a jaw arm 25.

On the infeed side the grippers 20 are provided with infeed skews 27, 28. From these extend the roughly parallel grip surfaces 23, each with a toothing in opposite direction 29A, 29B, as FIGS. 2A and 2B show in partial view and in detail. If there is no cap K inserted in the grippers 20, then the distance A of the grip surfaces 23 has a minor undersize compared to the cap outside diameter D.

FIG. 3 shows that the spring 26 and the movable jaws 21, 22 as well as a jaw plate 62, on which the fixed jaws 21 are formed, are held between two cover plates 60, 61. The jaw plate 62 has a corresponding cavity, in which the U-shaped jaw arms 22 have free space to move.

FIG. 4 shows a round cap magazine 3, which consists of a barrel shaped cap carrier 31, closed with a magazine cover 4, whereas a radial section remains free up to the rounded access opening 40, in which a welding cap K in the withdrawal position is pressed to the edge of a stop 32 at the cover.

The cover 4 has a small rim overlap 41 of the cap frame in the curve of the access opening 40, an induct skew 42 connecting to said rim overlap which is cascaded to the top side of the cover. At an embodiment with a hinged cover 4, a slot 43 is formed, through which reaches a bracket 34, bevelled on the outside, which keeps the cover shut.

On the other side of the access opening 40 a hinge 44 with a slotted hole 45 is formed in the extension level of the cover, the cones 46 of said hinge being held in a hinge support 47.

FIG. 5 shows the open round magazine 3 with a hinge and equipped with a welding cap K in the drill holes 30 of the cap carrier 31, the cap K protruding by a few millimeters. A firmly mounted spring box 33, schematically depicted, is in the centre of the cap carrier 31, said spring box carrying the bracket 34 so that it can be radially moved. A preloaded spindle or spiral spring is arranged centrally in the spring box 33, one end of the spring being fixed to the spring box 33, the other to the cap carrier 31, so that the latter is pressed with a torsion force P in the direction of the stop 32, which extends radially on the magazine cover.

The plate-shape bracket 34 extends in a diagonal guiding slot on the cover of the spring box 33. In the closed state, as shown here, a compression spring arrangement 35, held in the cover, extends from the bracket 34 and is supported by means of a support pin 36 on the rounded hinge support 47, and presses the bracket 34 in the closed position, in which it overlaps the cover 4 in the closed state and holds the rim overlap 41 in the overlap position, the cone 46 being in the rear stop position in the slotted hole 45, as FIG. 1 shows. To open the cover 4, the bracket 34 is pushed back manually. Alternatively, the round magazine can be implemented without a hinge for the opening of the cover. In this case the cover is only held in a movable manner, so that the shaft of the pincer, when inserted, slides the cover by the skew 42 to release the rim overlap.

FIG. 6 shows a top view on the magazine cover 4, whose main outline consists of two semi-circles with shifted centres M1, M2, whereby on one side the access opening 40 extends in the direction of the centre, and on the opposite side the hinge 44 extends on the outside. The slot in the cover 43 extends 4 in the central area in the direction between the access opening 40 and the hinge 44. The bracket 34 in the cover and in the fixed spring box 33 is guided in this direction. The cover 4 is about 15 mm high and largely hollow shaped and has a stiffening cover rim 48, which passes into the stop 32 and on the other side into the hinge 44. The cover 4 is lowered at the induct skew 42 by about 5 mm to the infeed area. Internally, the cover surface drives the caps to the withdrawal level when turned in the stop position. A chamber 49, which contains the compression spring arrangement 35, is represented with a dashed outline.

The compact construction of the cap extractor with the magazines allows for a significant reduction of the changing times, for example, from 22 to 17 sec, which corresponds to about 23%.

LIST OF REFERENCE SIGNS 1 spot welding cap changer
2 cap extractor
20 gripper
21, 22 jaws
23 grip surfaces
24 pivot joint
25 jaw arm
26 bracing spring
27, 28 infeed skews
29A, 29B toothing
3, 3A cap magazine
30 drill holes
31 cap carriers
32 stop
33 spring box
34 bracket
35 compression spring
36 support pin
4 magazine cover
40 access opening
41 rim overlap
42 induct skew on the cover
43 slot in the cover
44 hinge
45 slotted hole in the hinge
46 cones
47 hinge support
48 cover rim
49 compression spring chamber
5 support rail
50 mounting plates
60, 61 cover plates
62 jaw plate
A gripping jaw distance
D outside diameter of the caps
K cap
P advancing force
M1, M2 semicircle centres

The invention claimed is:

1. A cap magazine for spot welding caps, the cap magazine comprising:
   a cap carrier having a plurality of holes sized and shaped to receive a plurality of spot welding caps in a circular arrangement; and
   a spring for driving the cap carrier, the spring providing an advancing force to advance the caps one by one so that one of the caps bears against a stop in the cap magazine in an access position, the access position allowing one of the spot welding caps to be attached axially to a shaft of a pincer spot welding head and to be extracted from the cap carrier, and when the cap in the access position is extracted from the cap carrier, the spring advances another one of the caps into the access position.

2. The cap magazine of claim 1 further comprising a magazine cover positioned over the cap carrier.

3. The cap magazine of claim 2, wherein the magazine cover includes an access opening at the access position.

4. The cap magazine of claim 2, wherein the cap carrier rotates relative to the magazine cover.

5. The cap magazine of claim 2, wherein the magazine cover has a diameter that is greater than a diameter of the cap carrier such that the magazine cover extends beyond the cap carrier.

6. The cap magazine of claim 2, wherein the magazine cover has a stiffening cover rim.

7. The cap magazine of claim 1, wherein the cap carrier has an exterior surface that is at least partially exposed.

8. The cap magazine of claim 1, wherein when one of the spot welding caps is in one of the plurality of holes, the spot welding cap protrudes beyond an upper surface of the cap carrier.

9. The cap magazine of claim 1, wherein the cap carrier has a surface opposite the plurality of holes that is exposed at the access position.

10. The cap magazine of claim 1, wherein the cap carrier has an odd number of holes.

11. The cap magazine of claim 1, wherein the plurality of holes are non-uniformly spaced around the cap carrier.

12. The cap magazine of claim 1, wherein the plurality of holes are spaced around the cap carrier with an increased spacing between two of the plurality of holes.

13. The cap magazine of claim 1 wherein the spring is a spindle or spiral spring.

14. The cap magazine of claim 1, wherein the spring is arranged centrally in the cap carrier and the plurality of holes are positioned around the spring.

15. The cap magazine of claim 2, wherein the stop is below an upper surface of the magazine cover.

16. The cap magazine of claim 1, further comprising a spring box that includes the spring, one end of the spring being fixed at the spring box and the other end is fixed to the cap carrier.

17. A spot welding cap changer comprising:
   a cap extractor having a gripper which in response to an extraction movement detaches a spot welding cap of a pincer spot welding head inserted into the gripper from a shaft of the pincer spot welding head; and
   a cap magazine comprising a cap carrier having a plurality of holes sized and shaped to receive a plurality of spot welding caps in a circular arrangement, and a spring for driving the cap carrier, the spring providing an advancing force to advance the caps one by one so that one of the caps bears against a stop in the cap magazine in an access position, the access position allowing one of the spot welding caps to be attached axially to a shaft of a pincer spot welding head and to be extracted from the cap carrier, and when the cap in the access position is extracted from the cap carrier, the spring advances another one of the caps into the access position.

18. The spot welding cap changer of claim 17, wherein the cap magazine further comprises a magazine cover positioned over the cap carrier.

19. The spot welding cap changer of claim 18, wherein the magazine cover includes an access opening at the access position.

20. The spot welding cap changer of claim 18, wherein the cap carrier rotates relative to the magazine cover.

21. The spot welding cap changer of claim 18, wherein the magazine cover has a diameter that is greater than a diameter of the cap carrier such that the magazine cover extends beyond the cap carrier.

22. The spot welding cap changer of claim 18, wherein the magazine cover has a stiffening cover rim.

23. The spot welding cap changer of claim 17, wherein the cap carrier has an exterior surface that is at least partially exposed.

24. The spot welding cap changer of claim 17, wherein when one of the spot welding caps is in one of the plurality of holes, the spot welding cap protrudes beyond an upper surface of the cap carrier.

25. The spot welding cap changer of claim 17, wherein the cap carrier has a surface opposite the plurality of holes that is exposed at the access position.

26. The spot welding cap changer of claim 17, wherein the cap carrier has an odd number of holes.

27. The spot welding cap changer of claim 17, wherein the plurality of holes are non-uniformly spaced around the cap carrier.

28. The spot welding cap changer of claim 17, wherein the plurality of holes are spaced around the cap carrier with an increased spacing between two of the plurality of holes.

29. The spot welding cap changer of claim 17, wherein the spring is a spindle or spiral spring.

30. The spot welding cap changer of claim 17, wherein the spring is arranged centrally in the cap carrier and the plurality of holes are positioned around the spring.

31. The cap magazine of claim 2, wherein the stop is below an upper surface of the magazine cover.

32. The spot welding cap changer of claim 17, wherein the cap magazine further comprises a spring box that includes the spring, one end of the spring being fixed at the spring box and the other end is fixed to the cap carrier.

33. The spot welding cap changer of claim 17 further comprising an additional cap magazine, wherein both cap magazines are positioned opposite each other such that one magazine faces in a first direction and the other faces in the opposite direction.

34. The spot welding cap changer of claim 17, wherein the cap magazine is removable from the spot welding cap changer.

35. A cap magazine for spot welding caps, the cap magazine comprising:
   a cap carrier having a plurality of holes sized and shaped to receive a plurality of spot welding caps in a circular arrangement;
   a spring for advancing the caps one by one; and
   a stop for successively retaining each cap in an access position, the access position for allowing one of the spot welding caps to be extracted from the cap carrier;
   wherein, when the cap in the access position is extracted from the cap carrier, the spring advances another one of the caps into the access position.

36. The cap magazine of claim 35 further comprising a magazine cover positioned over the cap carrier.

37. The cap magazine of claim 36, wherein the magazine cover includes an access opening at the access position.

38. The cap magazine of claim 36, wherein the cap carrier rotates relative to the magazine cover.

39. The cap magazine of claim 36, wherein the magazine cover has a diameter that is greater than a diameter of the cap carrier such that the magazine cover extends beyond the cap carrier.

40. The cap magazine of claim 36, wherein the magazine cover has a stiffening cover rim.

41. The cap magazine of claim 35, wherein the cap carrier has an exterior surface that is at least partially exposed.

42. The cap magazine of claim 35, wherein when one of the spot welding caps is in one of the plurality of holes, the spot welding cap protrudes beyond an upper surface of the cap carrier.

43. The cap magazine of claim 35, wherein the cap carrier has a surface opposite the plurality of holes that is exposed at the access position.

44. The cap magazine of claim 35, wherein the cap carrier has an odd number of holes.

45. The cap magazine of claim 35, wherein the plurality of holes are non-uniformly spaced around the cap carrier.

46. The cap magazine of claim 35, wherein the plurality of holes are spaced around the cap carrier with an increased spacing between two of the plurality of holes.

47. The cap magazine of claim 35, wherein the spring is a spindle or spiral spring.

48. The cap magazine of claim 35, wherein the spring is arranged centrally in the cap carrier and the plurality of holes are positioned around the spring.

49. The cap magazine of claim 2, wherein the stop is below an upper surface of the magazine cover.

50. The cap magazine of claim 35 further comprising a spring box that includes the spring, one end of the spring being fixed at the spring box and the other end is fixed to the cap carrier.

51. The cap magazine of claim 1, wherein the cap carrier further comprises an inner sidewall defining a central cavity.

52. The cap magazine of claim 51, wherein the central cavity is located at the center of the cap carrier and is central to the plurality of holes.

53. The cap magazine of claim 51 further comprising a spindle located in the central cavity about which the cap carrier rotates.

54. The cap magazine of claim 53, wherein the spring is located in the central cavity and is attached at one end to the spindle and at the other end to the cap carrier.

55. The cap magazine of claim 1, wherein the spring drives the cap carrier without directly contacting the caps.

56. The cap magazine of claim 35, wherein the cap carrier further comprises an inner sidewall defining a central cavity.

57. The cap magazine of claim 56, wherein the central cavity is located at the center of the cap carrier and is central to the plurality of holes.

58. The cap magazine of claim 56 further comprising a spindle located in the central cavity about which the cap carrier rotates.

59. The cap magazine of claim 58, wherein the spring is located in the central cavity and is attached at one end to the spindle and at the other end to the cap carrier.

60. The cap magazine of claim 35, wherein the spring drives the cap carrier without directly contacting the caps.

* * * * *